(12) United States Patent
Stevens (10) Patent No.: US 8,851,519 B1
(45) Date of Patent: *Oct. 7, 2014

(54) RELEASABLE TETHER RETENTION SYSTEM

(71) Applicant: TK Holdings Inc., Armada, MI (US)

(72) Inventor: Bruce A. Stevens, Oakland, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,428

(22) Filed: Apr. 1, 2013

Related U.S. Application Data (60) Provisional application No. 61/618,834, filed on Apr. 1, 2012.

(51) Int. Cl.
B60R 21/2338 (2011.01)

(52) U.S. Cl.
CPC .................................. B60R 21/2338 (2013.01)
USPC .......... 280/743.2; 89/1.14; 102/531; 280/739

(58) Field of Classification Search
CPC .................................................. B60R 21/2338
USPC ............. 280/739, 742, 743.1, 743.2; 89/1.14; 102/531
See application file for complete search history.

(56) References Cited

U.S. PATENT DOCUMENTS

| 6,513,835 | B2 * | 2/2003 | Thomas ..................... 280/743.2 |
| 7,111,871 | B2 * | 9/2006 | Thomas ..................... 280/743.2 |
| 7,275,763 | B2 * | 10/2007 | Thomas et al. ............ 280/743.2 |
| 7,490,854 | B2 * | 2/2009 | Thomas ........................ 280/739 |
| 7,762,584 | B2 * | 7/2010 | Morita et al. ................. 280/739 |
| 7,832,763 | B2 | 11/2010 | Stevens ..................... 280/743.2 |
| 7,841,623 | B2 * | 11/2010 | Ito .............................. 280/743.2 |
| 8,015,906 | B2 * | 9/2011 | Ito et al. ......................... 89/1.14 |
| 8,408,585 | B2 * | 4/2013 | Paxton et al. .............. 280/728.2 |
| 2008/0238058 | A1 * | 10/2008 | Numoto et al. ............... 280/737 |
| 2013/0038046 | A1 * | 2/2013 | Inuzuka et al. ............ 280/743.2 |

OTHER PUBLICATIONS

U.S. Appl. No. 13/153,339.
U.S. Appl. No. 13/153,225.
U.S. Appl. No. 13/184,118.

* cited by examiner

*Primary Examiner* — Paul N Dickson
*Assistant Examiner* — TImothy Wilhelm
(74) *Attorney, Agent, or Firm* — L.C. Begin & Associates, PLLC (57) ABSTRACT

A releasable tether retention system is provided. The system includes a housing, a movable member movably mounted within the housing, and a sliding element coupled to the movable member so as to move with the movable member and so as to be extendible to an exterior of the housing to engage a tether.

18 Claims, 8 Drawing Sheets

RELEASABLE TETHER RETENTION SYSTEM

CROSS-REFERENCE TO RELATED APPLICATIONS

This application claims the benefit of U.S. Provisional Application Ser. No. 61/618,834 filed on Apr. 1, 2012, the disclosure of which is incorporated by reference.

BACKGROUND OF THE INVENTION

Airbags and other pliable and inflatable restraints are being designed using releasable tethers to selectively modify the shape of the restraint, to provide the restraint with enhanced rigidity, and to control venting of the restraint during deployment. While it is necessary to securely retain the tether prior to activation of the inflatable device, at some point during or after deployment of the inflatable device it is frequently necessary to release the tether so that it no longer restrains the inflatable device. Thus, there is an ongoing need for tether retention systems of reduced cost and/or complexity which reliably retain the tether until release of the tether is desired, and which also reliably release the tether at the desired time.

SUMMARY OF THE INVENTION

In one aspect of the embodiments of the present invention, a releasable tether retention system is provided. The system includes a housing, a movable member movably mounted within the housing, and a sliding element coupled to the movable member so as to move with the movable member and so as to be extendible to an exterior of the housing to engage a tether.

DETAILED DESCRIPTION

Referring to FIGS. 1-4, a releasable tether retention system 10 in accordance with one embodiment of the present invention includes a housing 12, a movable member 15 slidably mounted in housing 12, a sliding element 16 coupled to the movable member, and an actuator 18 operatively coupled to housing 12 for producing a motion of movable member 15 after receipt of an actuation signal.

Housing 12 has a first end 30 with a first opening 30a and a second end 32 opposite first end 30. The second end 32 includes a second opening 32a. A housing wall 12a connects ends 30 and 32. In the embodiment shown, openings 30a and 32a are coaxial along an axis B of the housing. An axial bore 24 extends through housing 12 between first end 30 and second end 32. One or more of ends 30 and 32 may be configured so as to be crimpable or otherwise deformable to aid in retaining actuator 18 (described below) or other components within (or to) housing 12. The deformable housing ends may also receive therein or engage other components to facilitate formation of seals proximate the ends of the housing. These seals may be substantially fluid-tight and may aid in retaining actuation fluid (for example, pressurized gases) in the housing during operation of the tether retention system to release the tether. Housing 12 may include features such a shoulder, taper 12b (as shown in FIGS. 1-4), or other feature configured to limit the travel of sliding element 16 (described below), movable member 15 (also described below) or other components within bore 24 during operation of the tether retention system. Housing 12 may be formed using any suitable method from a metallic material or any other suitable material.

In the particular embodiment shown in FIGS. 1-4, an end face 30z of housing first end 30 is staked or otherwise deformed such that a portion of the housing material is forced inwardly into a circumferential groove 15g formed along an exterior surface of movable member wall 15d. Positioning of the housing material in groove 15g aids in maintaining the movable member 15 in position within housing 12 prior to system activation, thereby maintaining sliding element 16 in position to support tether 22 prior to activation of the gas generating system. This positioning of the movable member 15 within the housing also maintains compressive loads on seals 302 and 300 prior to system activation. In addition, a portion of housing first end 30 is crimped inwardly or otherwise formed so as to provide a close sliding fit with movable member 15, which aids in supporting and stabilizing the movable member during motion of the member within the housing.

In the embodiment shown in FIGS. 1-4, at second end 32, housing 12 necks down or tapers from a first, relatively larger dimension D to a second, relatively smaller dimension d. A portion 12t of the housing leading from an interior of the housing to second opening 32a necks down or tapers from a first, relatively larger dimension down to the diameter or size of second opening 32a. As seen in FIGS. 1-4, the necked down or tapered portion 12t combines with sliding element second portion 16b and a shoulder 16z extending from the sliding element second portion 16b to define a cavity in which a seal 302 is compressed when the movable member 15 and the attached sliding element are positioned within housing 12 prior to activation of the gas generating system. Compression of seal 302 blocks the opening 32a to aid in sealing the housing interior during operation of the gas generating system. In addition, the diameter or size of housing second opening 32a is dimensioned with respect to the diameter or size of sliding element second portion 16b so as to create a sliding fit between the sliding element and the housing in this area. This necked down or tapered structure at housing second end 32 also provides a degree of lateral support to sliding element second portion 16b against a tether 22 wrapped around second portion 16b.

Figure 3:
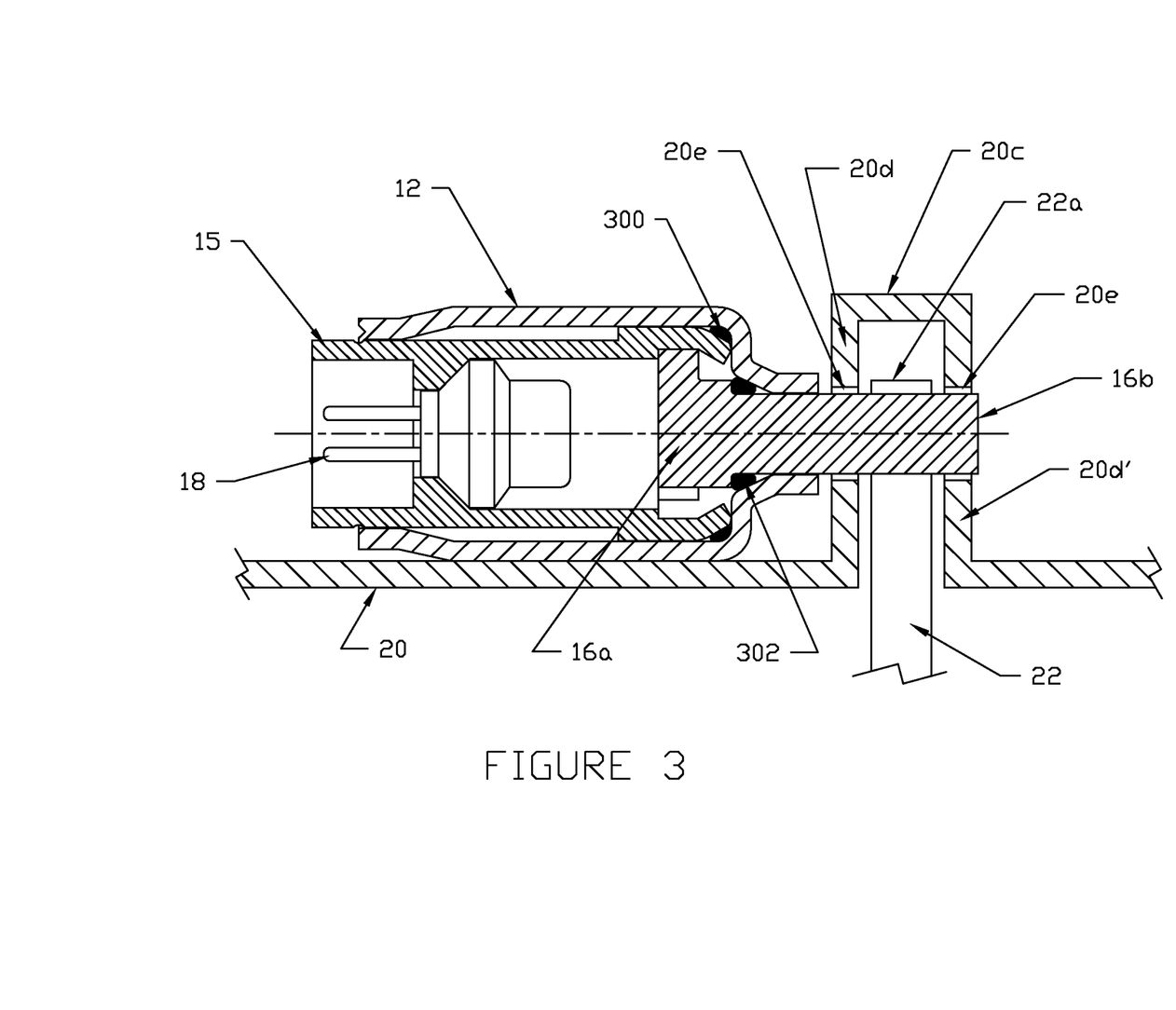
FIG. 3 is a cross-sectional side view of the embodiment of FIG. 1 mounted to a base and securing a tether in the pre-activation condition of the system.

Referring to FIG. 3, a base 20 is provided for mounting of housing 12 thereto. In one embodiment, base 20 comprises an integral portion of a vehicle or other device to which tether retention system 10 is to be attached. In another embodiment, base 20 is formed separately from the vehicle or other element and is attached by welding or any other suitable method to a portion of the vehicle or other device to which the tether retention system is to be secured. In one embodiment, base 20 includes a protrusion 20c formed therein and configured for receiving a portion of tether 22 therein. Protrusion 20c has at least one wall portion 20d with at least one opening 20e formed therein. Opening(s) 20e is sized so as to enable a portion of sliding element 16 to be inserted therein. An edge of opening 20e may provide a support or bearing surface for a portion of sliding element 16 extending into the opening.

Referring to FIG. 3, in one particular embodiment, protrusion 20c includes at least a pair of opposed wall portions 20d, 20d' in which a pair of associated coaxial openings 20e are formed. Openings 20e are sized so as to enable portions of sliding element 16 to be inserted therein. The opposed wall portions and associated openings 20e are also spaced apart so as to permit sliding element 16 to span the protrusion and extend into both of openings 20e prior to actuation of the system to release the tether. Edges of openings 20e may provide support or bearing surfaces for portions of sliding element 16 extending therethrough. Base 20 and any features thereof may be formed using any suitable method from a metallic material or any other suitable material.

A securement member (not shown) (for example, a conventional hold-down strap) may be used to secure the housing 12 to base 20 or to another portion of the vehicle or device to which the system 10 is attached. However, housing 12 may be secured to base 20 by welding or by any other suitable method.

Movable member 15 is configured to slidably move along and within bore 24. In the embodiment shown in FIGS. 1-4, member 15 has a base portion 15a and a first wall 15b extending from an edge of the base portion in a first direction to define an open-ended first cavity 15c. A shoulder 15s is formed along an interior of wall 15b to provide a surface against which lobes 16m of sliding element first portion 16a abut when positioned inside cavity 15c. Also, in the embodiment shown in FIGS. 1-4, a portion 15p of first wall 15b is crimped, formed, or otherwise directed inwardly to secure sliding element first portion 16a between shoulder 15s and the inwardly-directed portion of first wall 15b, thereby securing sliding element 16 to movable member 15. In addition, a shoulder 15w is formed along an exterior surface of wall 15b to provide a feature which abuts or otherwise engages a crimped or otherwise suitably-shaped portion of housing 12 during movement of the movable member in direction "A", to restrict further movement of the movable member. A second wall 15d also extends from an edge of the base portion in a second direction opposite the first direction to define an open-ended second cavity 15e. Second cavity 15e may house, for example, electrodes 18a extending from actuator 18 (described below). Second wall 15d may be configured to provide an interface mateable with a complementary connector of a wiring harness or other suitable initiator activation signal transmission medium.

Figure 1:
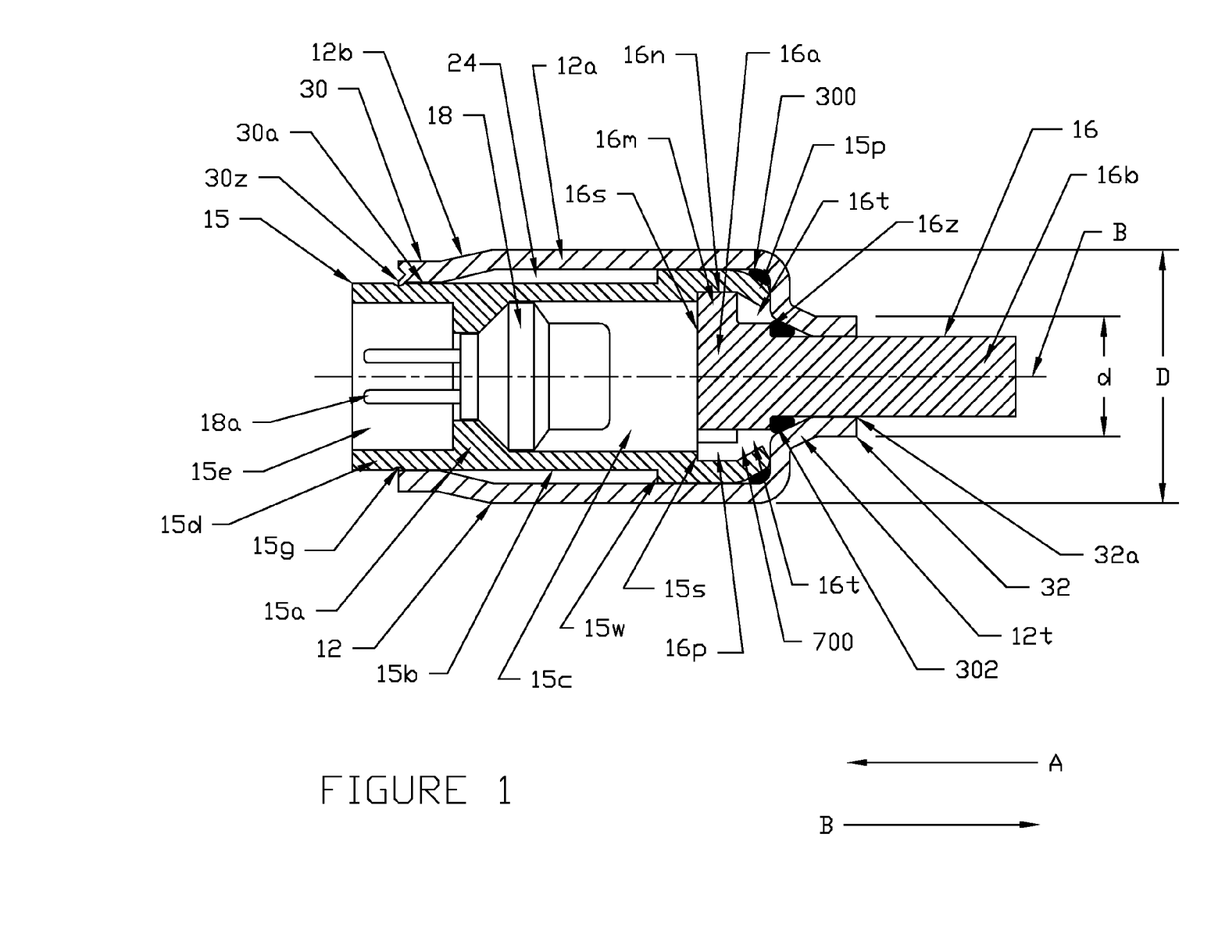
FIG. 1 shows a cross-sectional side view of a releasable tether retention system in accordance with an embodiment of the present invention in a pre-activation condition.

Movable member 15 is also dimensioned so as to slide along housing first end 30. The fit between movable member 15 and housing end 30 is configured to permit sliding of the movable member with respect to the housing wall while minimizing passage of actuation fluid through any clearance between the movable member and the housing. Movable member 15 may be formed from a metallic material or any other suitable material.

An actuator 18 is configured to enable fluid communication with an interior of housing 12 after activation of the tether retention system to release the tether. Actuator 18 provides and/or controls a flow of pressurized fluid that is directed into housing 12 to produce movement of movable member 15 and sliding element 16. In the embodiment shown in FIGS. 1-4, actuator 18 is positioned and secured to movable member base portion 15a within first cavity 15c.

In one embodiment, actuator 18 is in the form of an electrically-actuated pyrotechnic initiator, or squib, secured to movable member base portion 15a. Actuator 18 may be formed as known in the art. One exemplary actuator construction is described in U.S. Pat. No. 6,009,809, herein incorporated by reference. In this embodiment, electrodes of actuator 18 extend through movable member base portion 15a into second cavity 15d to enable connection with a suitable wiring harness, for example. Actuator 18 may be secured within movable member 15 using any of a variety of known methods including, but not limited to, an interference fit, adhesive application, or crimping.

In alternative embodiments, actuator 18 includes a nozzle or other device (not shown) coupled to movable member 15 and capable of directing a flow of actuation fluid into movable member first cavity 15c upon receipt by the retention system of a suitable activation signal. In these embodiments, activation of the system to release the tether results in a flow of pressurized actuation fluid to the nozzle or other device. The fluid then flows from the nozzle into first cavity 15c, resulting in movement of the movable member 15 as described below. A portion of the actuator may be positioned remotely from housing 12 but with a conduit or other fluid transmission medium extending to the nozzle or other device to enable conveyance of actuation fluid to the nozzle.

Figure 5:
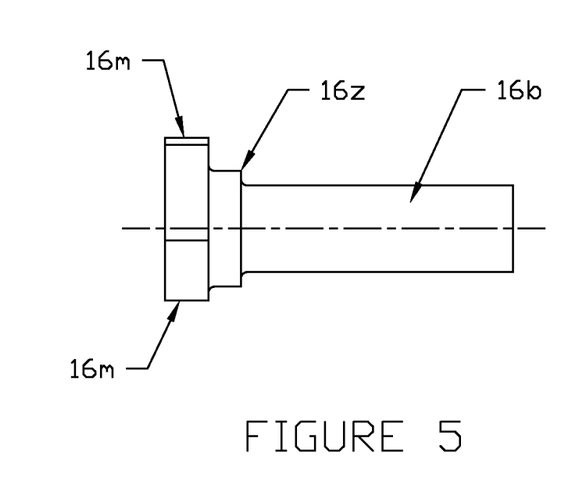
FIGS. 5 and 5a show a side view and an end view, respectively, of a sliding element in accordance with one embodiment of the present invention.
Figure 5A:
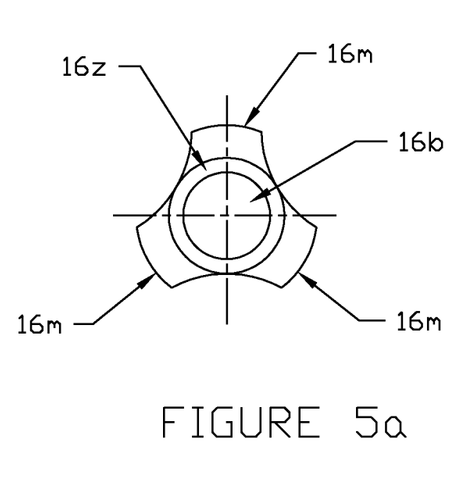
Figure 6:
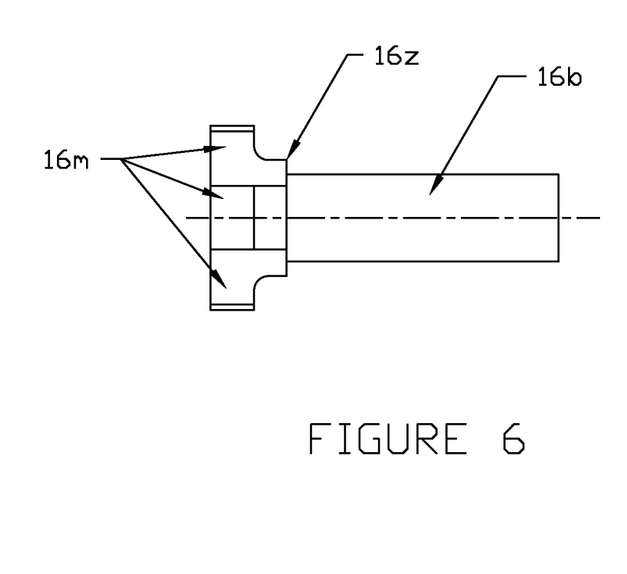
FIGS. 6 and 6a show a side view and an end view, respectively, of a sliding element in accordance with another embodiment of the present invention.
Figure 6A:
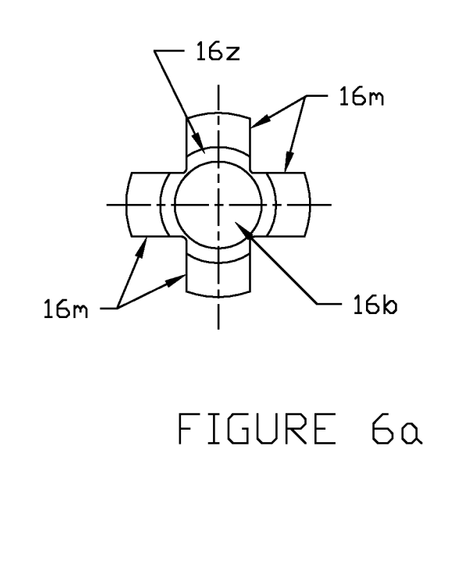

Referring to FIGS. 1-4, in the embodiment shown, sliding element 16 has a first portion 16a and a second portion 16b extending from the first portion. First portion 16a is positioned and secured within movable member cavity 15c, as previously described. As seen in the embodiments shown in FIGS. 1-4 first portion 16a includes a plurality of outwardly extending lobes 16m. In the embodiments shown in FIGS. 1-4, lobes 16m are equi-angularly spaced along a periphery of first portion 16a. FIGS. 5 and 5a show an embodiment with three lobes 16m, and FIGS. 6 and 6a show an embodiment with four lobes 16m. However, any desired number of lobes having any desired angular spacing (or different spacings) may be used. End portions of the lobes 16m are structured to abut shoulder 15s and are dimensioned with respect to the shoulder 15s and the interior of wall 15b to provide a snug fit, directed to minimizing passage of actuation fluid through any clearance between the wall 15b and the lobe end portions. In addition, the regions of the sliding element first portion 16a between lobes 16m are spaced apart from the wall 15b to provide fluid flow passages 16p between the sliding element first portion 16a and the wall 15b. These flow passages 16p enable fluid communication between a first side 16s of first portion 16a and a second side 16t of the first portion opposite the first side.

In the embodiments shown in the drawings, it is seen that inwardly-directed portion 15p of first wall 15b is structured and positioned so as to direct a flow of fluid exiting flow passages and impinging upon portion 15p toward the axis B. This aids in maintaining seal 302 in the cavity formed by tapered housing portion 12t and retention member portion 16b during initial motion of the retention member in direction A, and also during further movement of the retention member in direction A.

A shoulder 16z extends from second portion 16b near a junction between first portion 16a and second portion 16b. Shoulder 16z provides an abutment surface to aid in compressing seal 302 against housing tapered portion 12t, thereby providing a seal for the housing second end opening 32a.

Thus, first portion 16a is secured within cavity 15c (as previously described), welded or otherwise attached to movable member 15 so as to enable fluid communication between first cavity 15c and second side 16t of sliding element first portion 16a. Thus attached to movable member 15, sliding element 16 moves in conjunction with the movable member within bore 24 as described below. Sliding element 16 may be formed from a metallic material or any other suitable material.

Referring to FIG. 1, prior to actuation of the tether retention system to release the tether, a first seal 300 (for example, an O-ring or other suitable resilient seal) is seated in a cavity 301 defined by inwardly-directed portion 15p of first wall 15b and housing wall 12a. A groove or other suitable feature (not shown) may be provided in first wall 15b to aid in retaining seal 300 along an exterior of the wall 15b prior to and during insertion of the movable member 15 into housing 12. Alternatively, an adhesive or other suitable means may be employed to hold the seal in place. In addition, second seal 302 (for example, an O-ring or other suitable resilient seal) is positioned along sliding element second portion 16b abutting shoulder 16z. Seals 300 and 302 aid in minimizing escape of actuation fluid through any clearance between the movable member 15 and the housing 12, and between sliding element 16 and endcap 70.

When positioned as shown in FIGS. 1-4, sliding element first portion 16a effectively defines a boundary between two chambers. A first chamber (on a first side of first portion 16a) is essentially first cavity 15c. A second chamber 700 is defined by the portion of the interior of housing 12 residing on a second side of first portion 16a opposite the first side.

As shown in FIGS. 1-4, when installed in a vehicle and arranged so as to secure a tether 22, and prior to activation of the system to release the tether, sliding element 16 extends into openings 20e formed in protrusion 20c, spanning the width of the protrusion. A looped end 22a of the tether extends into protrusion 20c and is looped over sliding element second portion 16b. In this embodiment, edges of openings 20e may provide support or bearing surfaces for portions of sliding element 16 and aid in preventing the tether from sliding off the end of the sliding element.

Referring to FIGS. 1-4, in one method of assembly, actuator 18 is secured within movable member 15. Sliding element 16 is then attached to the movable member. The movable member/sliding element sub-assembly is then inserted into and slidably secured within housing 12. The sliding element second portion 16b is inserted into an opening 20e closest to the housing 12 and through the looped end 22a of tether 22. The sliding element is then passed through the remaining opening 20e positioned along the opposite side of the protrusion. Housing 12 may be secured to base 20 either before or after insertion of the movable member and sliding element therein. The deformable element 80 is then positioned in groove 16g to restrict motion of the sliding element prior to system actuation.

Figure 8:
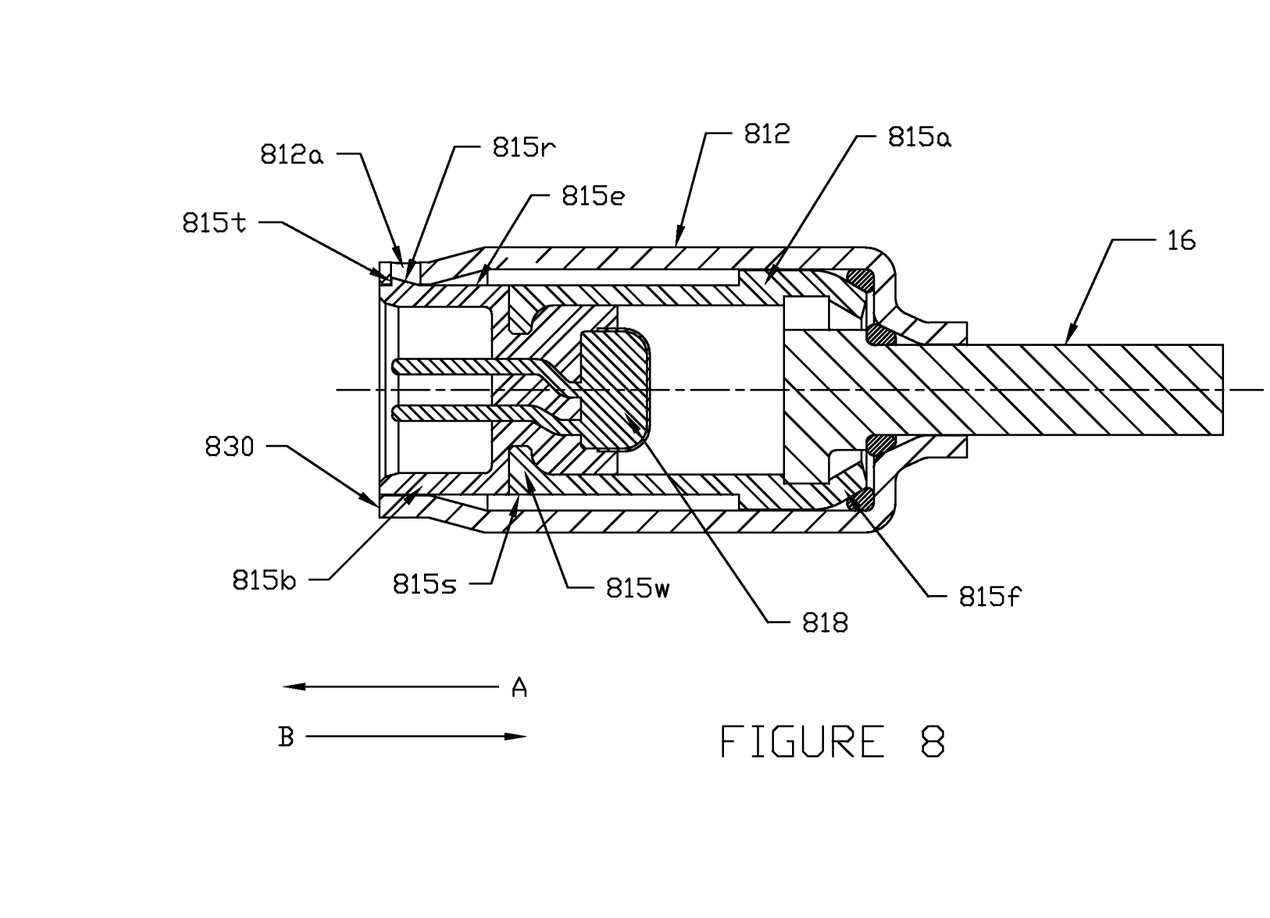
FIG. 8 shows a cross-sectional side view of a releasable tether retention system in accordance with another embodiment of the present invention in a pre-activation condition.

Referring to FIG. 8, in another embodiment similar to the embodiment shown in FIG. 1, a movable member 815 has a first portion 815a and a second portion 815b molded or otherwise secured to the first portion so as to move with the first portion. First portion 815a has a first end 815f which grips and retains the sliding element 16 as previously described. In the embodiment shown in FIG. 8, first portion 815a also has a second end 815s including one or more features (for example, wall 815w) structured to facilitate insert molding of a part of first portion 815a into second portion 815b, thereby securing the first and second portions together. Also, in the embodiment shown in FIG. 8, an initiator 818 is insert-molded into second portion 815b. A cavity or hole 812a is formed in housing 812 proximate first end 830. A ramp 815r is molded or otherwise formed along an exterior surface 815e of movable member second portion 815b. The ramp terminates in a shoulder 815t extending generally perpendicular to the surface 815e. Ramp 815 facilitates insertion of second portion 815b into housing in direction B until shoulder 815t reaches hole 812, at which point the shoulder snaps into the hole. Projection of shoulder 815t into hole 812a aids in retaining the movable member 815 in position within housing 812 prior to system activation, thereby maintaining sliding element 16 in position to support tether 22. After system activation, during movement of movable member second portion 815b in direction A as described below, the molded ramp 815r is sheared or otherwise deformed such that the shoulder 815t no longer maintains the movable member in the pre-activation position. The structure and operation of the embodiment shown in FIG. 8 is otherwise the same as that shown and described for FIG. 1.

Figure 2:
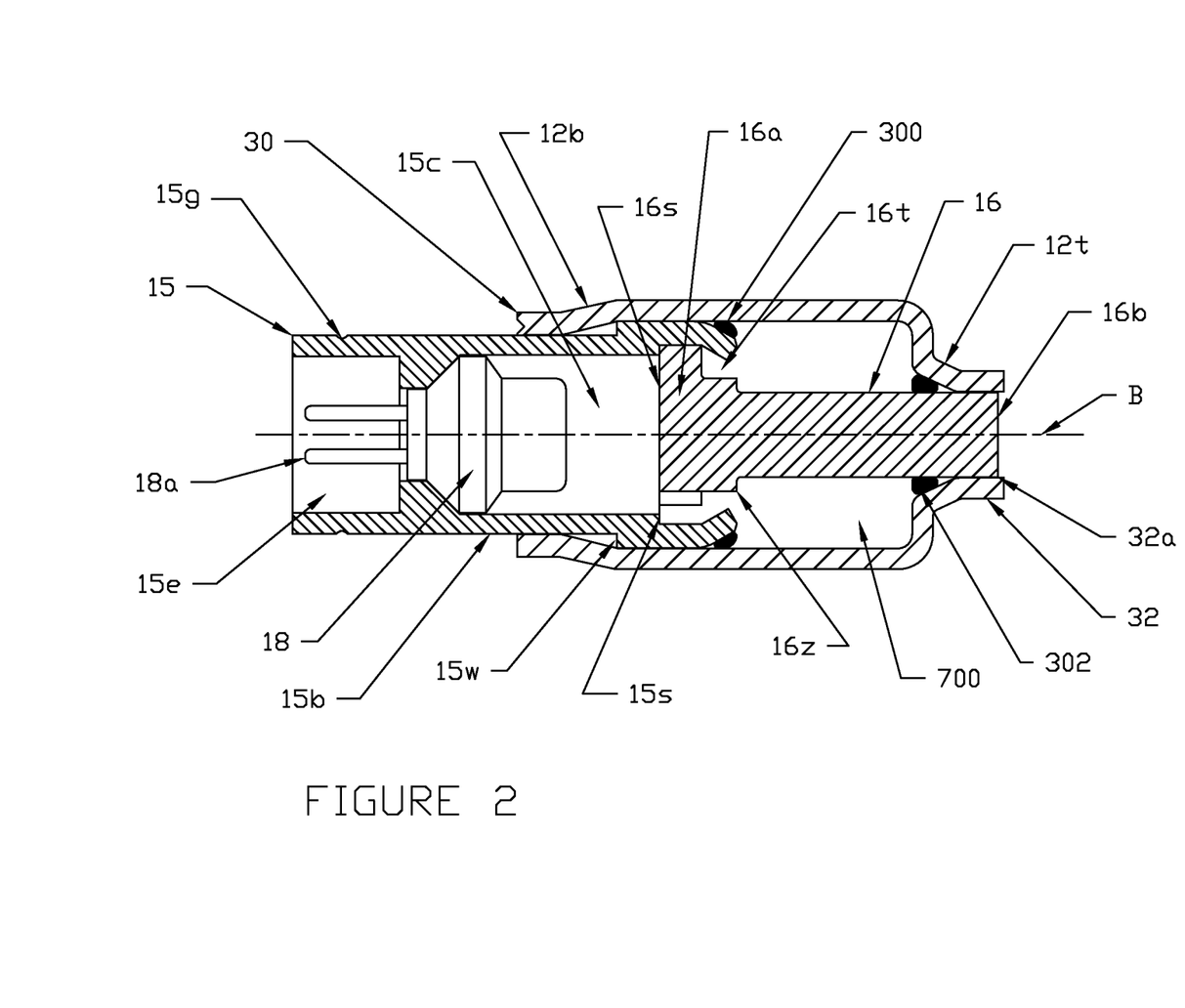
FIG. 2 is a cross-sectional side view of the embodiment of FIG. 1 after activation of the retention system to release a tether secured by the system.

Referring to FIGS. 1-3, in operation, upon receipt of a signal from a crash sensor or other system activation mechanism, an actuation signal is sent to actuator 18. In an embodiment where the actuator is a conventional squib or initiator, combustion products from the squib flow along first cavity 15c and through the gas flow passages 16p formed between lobes 16m of sliding element 16, from cavity 15c into second chamber 700. Pressurized actuation fluid is forced between sliding member first portion 16a and housing second end 32, causing sliding member 16 and the attached movable member 15 to move in direction "A". As the forces urging slidable element in direction "A" increase, the housing material extending into circumferential groove 15g is stressed to the point where it no longer acts to prevent motion of the movable member 15 in direction "A". Sliding member 15 detaches from housing first end 30, allowing the sliding element and movable member to continue moving in direction "A". This movement of the sliding element extracts sliding element second portion 16b from one or more of openings 20e (FIG. 3) to a degree sufficient to remove second portion 16b from tether looped end 22a, thereby releasing the tether.

Pressurized actuation fluid passing through flow passages 16p also forces seal 302 toward opening 32a and aids in compressing the seal against the surfaces of sliding element second portion 16b and housing second end 32, to enhance effectiveness of the seal. Seal 300 is also pressed against wall portion 15p by the pressurized gas, thereby enhancing effectiveness of seal 300.

Movement of movable member 15 in direction "A" may continue until sliding element shoulder 15w abuts a crimped or otherwise suitably configured portion of housing 12. Alternatively, other features may be incorporated into one or more of housing 12, sliding element 16 and movable member 15 which interengage to stop motion of the sliding element in direction "A".

Figure 4:
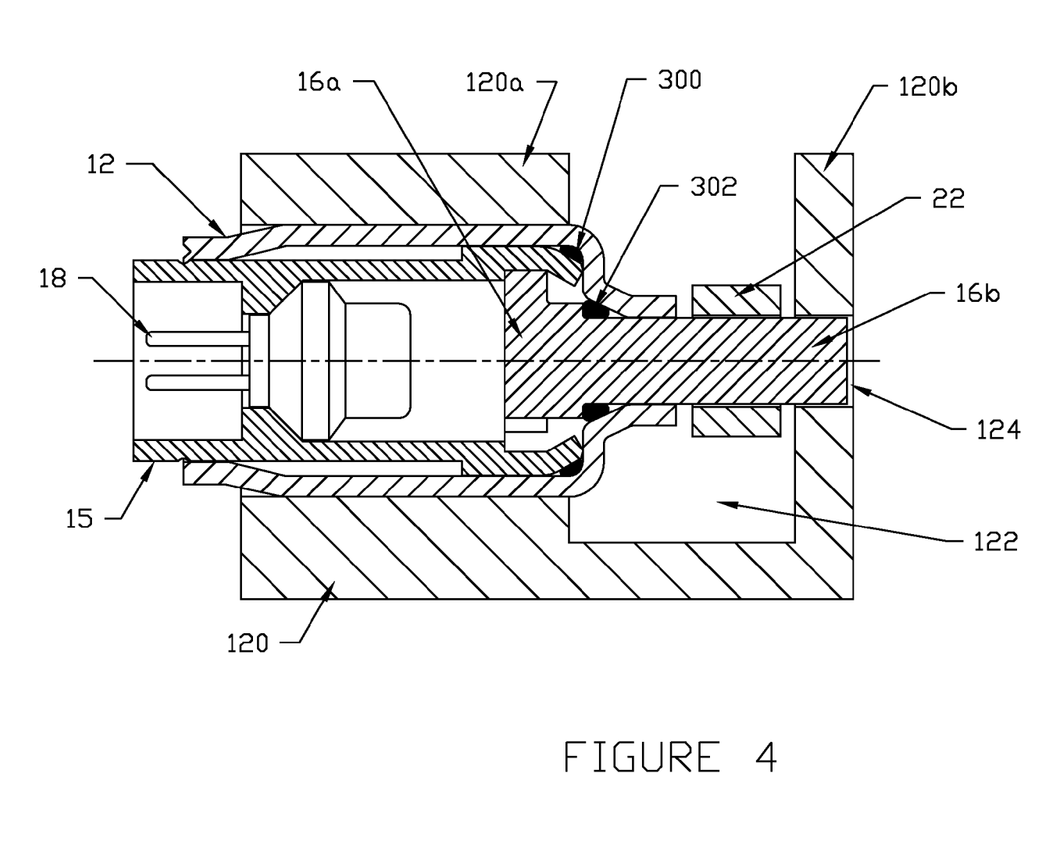
FIG. 4 is a plan view of the embodiment and configuration shown in FIG. 3.

Referring to FIG. 4, in a particular embodiment, housing 12 is mounted to a base 120 into which an opening 122 is formed between a first portion 120a and a second portion 120b of the base. Opening 122 permits tether 22 to extend through the base so that the looped end of the tether can be supported by sliding element 16. A hole 124 is formed in second portion 120b for receiving an end of sliding element 16 therein to support the end of the sliding element. Thus, sliding element 16 extends from housing 12 across opening 122 to second base portion 120b. Operation of the system shown in FIG. 4 to release the tether is as previously described.

Figure 7:
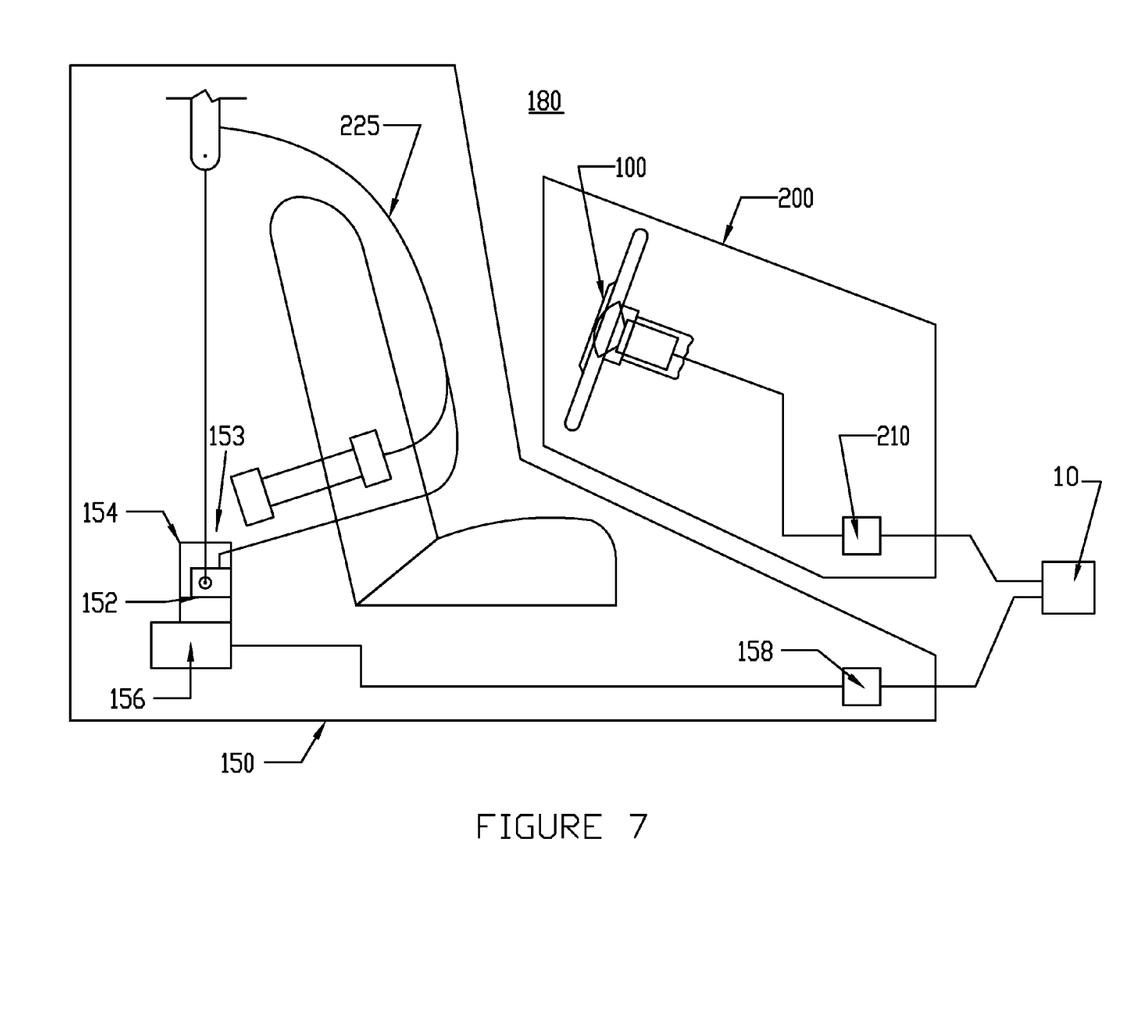
FIG. 7 is a schematic representation of an exemplary vehicle occupant protection system incorporating a releasable tether retention system in accordance with an embodiment of the present invention.

FIG. 7 shows a particular application of a releasable tether retention system 10 in accordance with the present invention. Referring to FIG. 7, the releasable tether retention system is incorporated into a vehicle occupant protection system 180 including additional elements such as, for example, a safety belt assembly 150 and/or an airbag module. FIG. 7 shows a schematic diagram of one exemplary embodiment of such a protection system. Tether retention system 10 may be in operable communication with a crash event sensor 210 which is in communication with a known crash sensor algorithm that signals actuation the tether release mechanism via activation of actuator 18 based on any desired criteria, for example, the occurrence of a collision event, deployment of a vehicle airbag, the occurrence of a predetermined occupant condition, or any other desired criteria.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743, 480, 5,553,803, 5,667,161, 5,451,008, 4,558,832 and 4,597, 546, incorporated herein by reference. Illustrative examples of typical pretensioners in system 150 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

If desired, one or more of sensors 210 and/or 158 may be operatively coupled to valve release mechanism actuator 18 to provide one or more associated inputs prompting activation of the valve release mechanism, depending on such factors as vehicle occupant weight, elapsed time since the occurrence of a collision event, or any other pertinent factors.

It will be understood that the foregoing description of the embodiments of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A releasable tether retention system comprising:
    a housing;
    a movable member movably mounted within the housing;
    a sliding element coupled to the movable member so as to move with the movable member and so as to be extendible to an exterior of the housing to engage a tether,
    wherein the movable member has a base portion and a first wall extending from an edge of the base portion in a first direction to define a first cavity, wherein the sliding element has a first portion and a second portion extending from the first portion, and wherein the first portion is positioned and secured within the first cavity,
    and wherein the system further comprises at least one fluid flow passage extending between a first side of the sliding element first portion to a second side of the sliding element first portion opposite the first side, and
    wherein the first portion includes a plurality of outwardly extending lobes, and wherein the at least one fluid flow passage is defined by the moving member first wall and a space between adjacent lobes of the plurality of lobes.

2. The system of claim 1 further comprising an actuator operatively coupled to the housing for producing a motion of the movable member after activation of the retention system.

3. The system of claim 2 wherein the movable member has a base portion and a first wall extending from the base portion in a first direction to define the first cavity, and wherein the actuator is mounted in the first cavity.

4. The system of claim 1 further comprising a seal formed between the housing and the sliding element, and sealing a housing opening through which the sliding element extends to the housing exterior.

5. The system of claim 1 wherein the housing includes means structured to limit travel of the movable member within the housing during operation of the tether retention system.

6. The system of claim 1 further comprising a base structured for attachment to a vehicle, and wherein the housing is mounted to the base.

7. The system of claim 1 wherein the movable member has a base portion and a first wall extending from an edge of the base portion in a first direction to define a portion of the first cavity.

8. The system of claim 1 further comprising a base structured for mounting of the housing thereto, the base including a protrusion formed therein and configured for receiving a portion of a tether therein.

9. The system of claim 8 wherein the protrusion includes at least one wall portion with at least one opening formed therein, and wherein the at least one opening(s) is sized so as to enable a portion of the sliding element to be inserted therein.

10. The system of claim 9 wherein an edge of the at least one opening is structured to provide a bearing surface for a portion of the sliding element when the sliding element is inserted into the at least one opening.

11. The system of claim 9 wherein the protrusion includes a pair of opposed wall portions in which a pair of associated coaxial openings are formed, wherein the openings are sized so as to enable a portion of sliding element to be inserted therein, and wherein the wall portions are spaced apart so as to permit the sliding element to span the protrusion and extend into both of openings prior to actuation of the system to release the tether.

12. A vehicle incorporating a tether retention system in accordance with claim 1.

13. The system of claim 1 wherein the housing includes an opening through which the sliding element is extendible from an interior of the housing to an exterior of the housing, and a tapered portion defining a cavity adjacent the opening; and
    a seal positioned in the cavity so as to abut the tapered portion and the retention member prior to activation of the system.

14. A vehicle occupant protection system incorporating a tether retention system in accordance with claim 1.

15. A releasable tether retention system comprising:
a housing;
a movable member mounted in the housing so as to be movable along an axis; and
a tether retention member secured to the movable member so as to move with the movable member, the retention member having a first portion including at least one opening enabling fluid flow from a first side of the first portion to a second side of the first portion opposite the first side,
wherein the movable member is structured to direct a flow of fluid exiting the at least one opening toward the axis.

16. The system of claim 15 wherein the first portion is secured to the movable member by a portion of the movable member structured to direct a flow of fluid exiting the at least one opening and impinging upon the portion of the movable member toward the axis.

17. The system of claim 15 wherein the housing includes an opening through which the retention member is extendible from an interior of the housing to an exterior of the housing, and a tapered portion defining a cavity adjacent the opening; and
a seal positioned in the cavity so as to abut the tapered portion and the retention member prior to activation of the system.

18. A vehicle occupant protection system incorporating a tether retention system in accordance with claim 15.

* * * * *